(12) United States Patent
Patterson

(10) Patent No.: US 7,019,495 B2
(45) Date of Patent: Mar. 28, 2006

(54) INTER-REGULATOR CONTROL OF MULTIPLE ELECTRIC POWER SOURCES

(75) Inventor: Ciaran J. Patterson, Chicago, IL (US)

(73) Assignee: C.E. Neihoff & Co., Evanston, IL (US)

( * ) Notice: Subject to any disclaimer, the term of this patent is extended or adjusted under 35 U.S.C. 154(b) by 116 days.

(21) Appl. No.: 10/650,617

(22) Filed: Aug. 28, 2003

(65) Prior Publication Data

US 2005/0046396 A1    Mar. 3, 2005

(51) Int. Cl.
*H02J 3/50* (2006.01)
*H02J 3/06* (2006.01)
*H02J 1/00* (2006.01)
*H02K 7/18* (2006.01)

(52) U.S. Cl. .............................. 322/7; 322/22; 322/28
(58) Field of Classification Search .................. 322/15, 322/22–25, 28, 45
See application file for complete search history.

(56) References Cited

U.S. PATENT DOCUMENTS

| | | | |
|---|---|---|---|
| 2,894,149 A | 7/1959 | Dortort ........................ 307/57 |
| 3,294,976 A | 12/1966 | Tipton et al. ................. 307/57 |
| 3,303,349 A | 2/1967 | Sinclair et al. ............... 307/58 |
| 3,621,370 A * | 11/1971 | Vandervort .................... 322/23 |
| 3,809,996 A | 5/1974 | Meisenheimer ............. 322/28 |
| 4,045,718 A | 8/1977 | Gray ........................... 320/123 |
| 4,156,836 A | 5/1979 | Wiley .......................... 320/123 |
| 4,239,978 A | 12/1980 | Kofink ......................... 307/16 |
| 4,314,193 A * | 2/1982 | Mortonson .................... 322/28 |
| 4,315,204 A * | 2/1982 | Sievers et al. ................. 322/28 |
| 4,336,485 A | 6/1982 | Stroud ......................... 320/126 |
| 4,347,473 A | 8/1982 | Stroud ......................... 320/126 |
| 4,348,629 A * | 9/1982 | Sievers ......................... 322/99 |
| 4,379,990 A * | 4/1983 | Sievers et al. ................. 322/99 |
| 4,509,005 A | 4/1985 | Stroud ......................... 320/126 |
| 4,539,515 A | 9/1985 | Morishita et al. ............ 320/123 |
| 4,559,487 A * | 12/1985 | Sims et al. ..................... 322/24 |
| 4,604,565 A | 8/1986 | Yokota et al. ............... 320/123 |
| 4,720,645 A | 1/1988 | Stroud ....................... 310/68 D |
| 4,728,806 A | 3/1988 | Baker et al. ................... 307/43 |
| 4,757,249 A | 7/1988 | Farber et al. ................ 320/126 |
| 4,775,828 A * | 10/1988 | Watley et al. .................. 322/7 |
| 4,788,486 A | 11/1988 | Mashino et al. ............. 320/123 |
| 4,829,228 A | 5/1989 | Buetemeister ............... 322/27 |
| 5,233,229 A | 8/1993 | Kohl et al. ................. 307/10.1 |
| 5,254,936 A | 10/1993 | Leaf et al. ..................... 322/90 |

(Continued)

*Primary Examiner*—Darren Schuberg
*Assistant Examiner*—Pedro J. Cuevas
(74) *Attorney, Agent, or Firm*—Brinks Hofer Gilson & Lione

(57) ABSTRACT

The present invention includes a system and method for controlling multiple sources of electric power using inter-regulator control. The regulators in the system may be of a universal type that may operate either as a master regulator or a follower regulator. Determination whether a regulator operates as a master or a follower regulator may occur before operation of the system, during operation of the system, or may reverse the role of master and follower regulators in response to operating conditions. The master regulator may control its source of electric power and may send signals to the follower regulators to control their sources of electric power. The control of the sources of electric power may be based on sensing output of at least one of the sources of electric power and based on the operational characteristics of at least one of the sources of electric power. Further, the follower regulator may verify the instructions sent from the master regulator.

64 Claims, 6 Drawing Sheets

U.S. PATENT DOCUMENTS

| | | |
|---|---|---|
| 5,600,232 A | 2/1997 | Eavenson, Sr. et al. ....... 322/12 |
| 5,642,033 A | 6/1997 | Bartol et al. .................. 322/25 |
| 5,723,972 A | 3/1998 | Bartol et al. .................. 322/15 |
| 5,731,688 A * | 3/1998 | Thomson ..................... 322/22 |
| 5,734,255 A * | 3/1998 | Thompson et al. ............ 322/7 |
| 5,739,676 A | 4/1998 | Judge et al. .................. 322/22 |
| 5,745,356 A * | 4/1998 | Tassitino et al. .............. 363/71 |
| 5,754,033 A * | 5/1998 | Thomson ..................... 322/45 |
| 5,973,481 A * | 10/1999 | Thompson et al. ............ 322/7 |
| 6,218,813 B1 * | 4/2001 | Davis .......................... 322/20 |
| 6,275,012 B1 * | 8/2001 | Jabaji ......................... 322/22 |
| 6,356,471 B1 * | 3/2002 | Fang ........................... 363/65 |
| 6,373,230 B1 * | 4/2002 | Jabaji ......................... 322/28 |
| 6,700,214 B1 * | 3/2004 | Ulinski et al. ............ 290/40 C |
| 6,717,386 B1 * | 4/2004 | Kanasugi et al. ............. 322/27 |

\* cited by examiner

INTER-REGULATOR CONTROL OF MULTIPLE ELECTRIC POWER SOURCES

BACKGROUND

Electrical power for vehicles, including automobiles, trucks and buses, is typically supplied by alternator-battery systems. The alternator is usually driven by mechanical means to generate electric power. The power output of the alternator is controlled by a voltage regulator, which senses the voltage output of the alternator and adjusts the alternator magnetic field or rectification control to maintain a desired value of alternator output voltage.

The electrical power for the vehicles may be used in heavy duty, high current applications, such as operating vehicular air conditioning. In such applications, a single alternator may not produce sufficient electric power. To generate additional power, two or more alternators may be connected in parallel when the total system electrical load exceeds the power generating capacity of a single alternator.

If two or more alternators are required in a system, each alternator typically has its own voltage regulator. The voltage control is therefore performed independently for each alternator. In this instance, even if the multiple alternators are identical in every respect, there remain different voltages present in the system due to variety of factors. One factor is different voltages present in the system due to cabling and connection voltage drops that change with electrical load. For example, an alternator's location within the system requires interconnecting cabling and connectors that may affect the voltage at the alternator's output. Another factor is differences in alternator performances. For example, an alternator's performance may be affected by its operating temperature. Temperature variations in the system may result in the alternators operating at different temperatures, thereby resulting in different alternator outputs. These temperature variations may be due to internal or external cooling airflow dynamics or the proximity to nearby sources of heating or cooling.

As a result, when load changes occur, the portion of the total electrical load supplied by each alternator is not predicable or constant. Rather, the instability of the system is manifested by unstable output voltages and unbalanced distribution of electrical load as load changes occur. This instability is a condition called "hunting" and is caused by the portion of the total load supplied by each individual alternator not being constant. Another undesirable effect of the instability is that one alternator in the system assumes most, or potentially all, of the total system load. In such cases the overworked alternator may suffer premature failure.

Solutions to the problem of multiple alternators have been attempted. One such attempt is disclosed in U.S. Pat. No. 5,723,972 (Bartol et al.) in which two or more alternators are electrically connected in parallel across a battery and load. A corresponding number of electronic voltage regulators individually control the alternators, with one regulator that is specially configured as the master and the other regulators are configured as followers to receive a signal from the master regulator. The master regulator only senses the voltage across the battery and generates a master control signal for use in both the master regulator and all follower regulators to generate the power to the electric loads and maintain regulated voltage.

What is needed is better inter-regulator control of multiple alternators.

SUMMARY

In one aspect of the invention, a system and method for controlling multiple sources of electric power is provided. The system may include multiple voltage regulator—source of electric power combinations with the sources of electric power being electrically connected in parallel. The sources of electric power may include alternators or fuel cells. One of the regulators may be the master regulator and the remaining regulator(s) may be the follower regulator(s). The master regulator may produce signals for its respective source of electric power and produce signals for follower regulator(s) based on the sensed output of at least one source of electric power and on operational characteristics of at least one source of electric power. One example includes the master regulator producing signals for the follower regulators based on sensing the output and the operating characteristics of its respective alternator. The operational characteristics of the sources of electric power may include: (1) designed operational characteristics, such as output rating; and (2) variable operating characteristics, such as ambient temperature, operating temperature, speed, and accumulated operational life.

In another aspect of the invention, a regulator is disclosed with the functionality of the master regulator and the functionality of the follower regulator combined into a universal regulator device. In this manner, the design and maintenance of the system is simplified. Rather than having two separate regulators, one for a master regulator and another for a follower regulator, a single universal regulator may be used. Determining whether a universal regulator operates as a master or a follower regulator may occur before operation (such as by hardwiring the regulator via a switch or by programming to operate as a master or follower regulator) or during operation (such as by an arbitration process between regulators to determine the master and follower regulators). Once a master regulator has been determined, such as by arbitration, this determined regulator may remain as the master regulator for the duration of the present period of operation. Alternatively, if this determined regulator is not the master regulator for the duration of the present period of operation, another regulator in the system may be the master regulator for at least a portion of the present period of operation. The regulators may also alternate between master and follower status based on a predetermined duty cycle or default condition. With this scheme, the primary point of voltage reference for the system may shift to different points of voltage measurement in the system (such as each possible point of voltage measurement in the system), thereby ensuring that the system voltage is, on average and over an extended period of operation, regulated at all possible points in the system.

In still another aspect of the invention, follower regulator(s) may verify the instructions and commands sent from the master regulator. The verification of the instructions may be based on the follower regulator sensing the output of its associated source of electric power. Further the verification by the follower regulator may be based on the operational characteristics of its associated source of electric power.

In yet another aspect of the invention, a diagnostic tool may be used to evaluate the regulator-alternator system. The diagnostic tool may be used either during testing of the system or during operation.

DETAILED DESCRIPTION OF THE INVENTION

Figure 1:
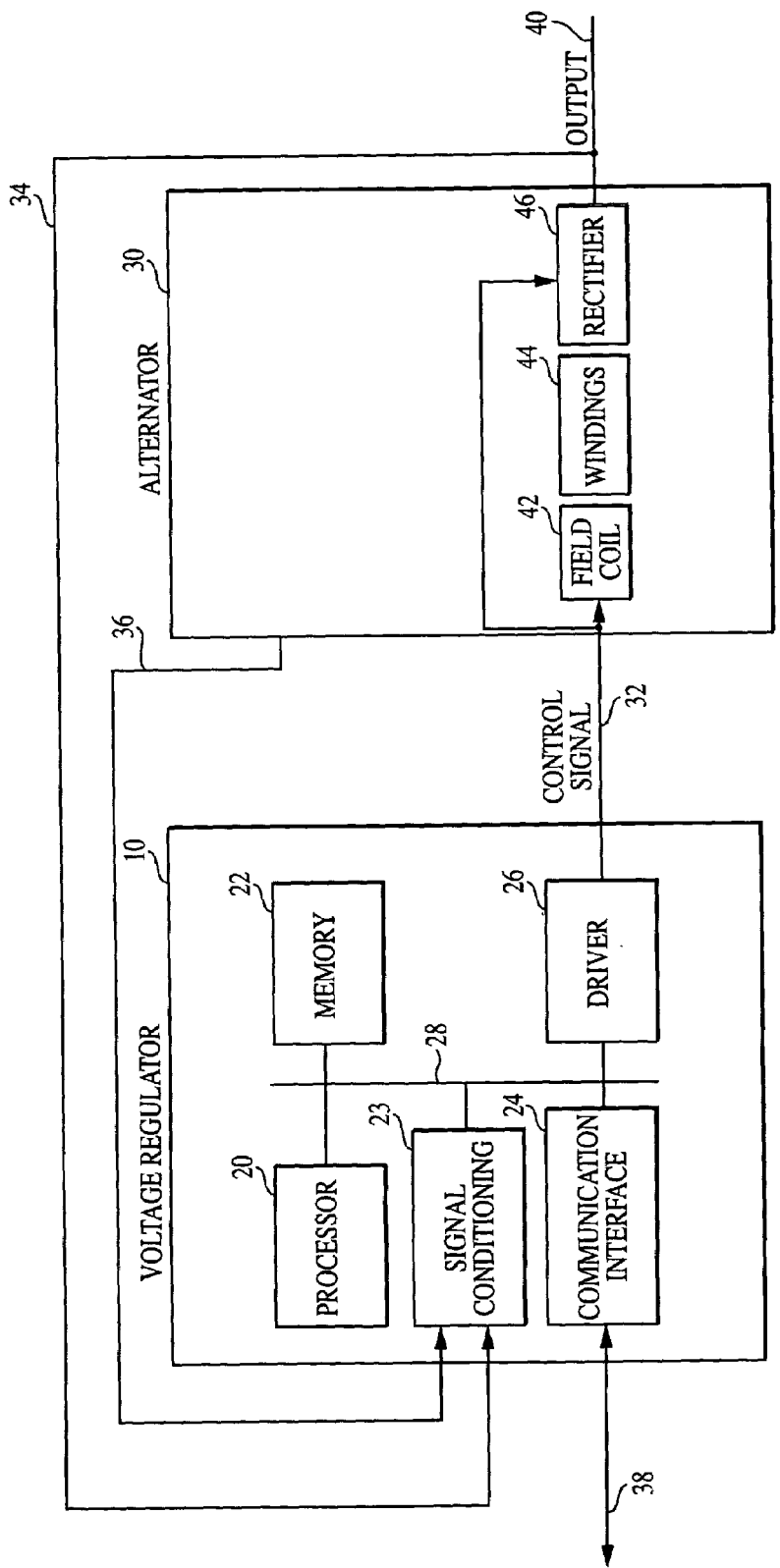
FIG. 1 is an exemplary block diagram of a voltage regulator—alternator combination.

Turning to the drawings, wherein like reference numerals refer to like elements, FIG. 1 shows an exemplary block diagram of a voltage regulator—alternator combination. Alternator 30 is a conventional alternator and may comprise a field coil 42, windings 44, and a rectifier 46. The field coil 42 may be supplemented by, or replaced by, a permanent magnet. The windings 44 may include three power output windings so that the alternator is a three-phase machine, though the present invention is not so limited. Alternator 30 may further include a rectifier 46 that rectifies the alternating current (AC) outputs of power output windings into direct current (DC). The rectifier 46 may comprise diodes or other types of switching devices. For an alternator which comprises a permanent magnet, the rectifier may comprise a silicon controlled rectifier (SCR). Further, the control of the output of the alternator may comprise controlling the SCR, as shown by the arrow into block 46. Alternator 30 produces output power at output 40 when field coil 42 modulates changes in electromagnetic coupling within the power output windings 44. Further, an energy storage device, such as a battery or a capacitor, may be connected to output 40.

Alternator 30 is merely one example of a source of electric power. Other types of generators may be used as a source of electrical power. Further, a fuel cell may be used as a source of electric power. The fuel cell may be paired with a regulator, with the regulator regulating the amount of electric power generated by the fuel cell. Specifically, the regulator may control either a valve or a heating element in the fuel cell, thereby regulating the amount of electric power generated by the fuel cell.

The voltage regulator 10 includes a processor 20 and a memory device 22. The processor 20 and memory device 22 may be integral with one another. For example, the processor 20 and memory device 22 may be housed in a single device, such as a microcontroller. Alternatively, the processor 20 and memory device may be separate components, such as a microprocessor in combination with read-only memory. Further, the voltage regulator 10 may be a separate component within the vehicle, or may be a part of a system controller of the vehicle, such as an engine control unit or an electrical system monitor.

Voltage regulator also includes signal conditioning interface 23 which receives analog or digital feedback signals from the alternator. One of these signals may be the sensed feedback voltage 34 of the alternator. The sensed feedback voltage 34 may be taken at the terminal voltage of the alternator to which the regulator is connected, as shown in FIG. 1. Alternatively, the sensed feedback voltage may be taken at the terminal voltage of another alternator or at the connection to the energy storage device (such as a battery, capacitor, etc.). The sensed feedback voltage 34, though shown as a single line in FIGS. 1 and 2, may include a single line for the power output or may include multiple lines including a power output and a ground line. Another input to the signal conditioning interface 23 may be output 36 received from the alternator. This output 36 may comprise some or all of the operational characteristics of the alternator. For example, output 36 may include the current operational characteristics, such as current ambient temperature, current operating temperature, and speed of alternator 30. Moreover, output 36 may include designed operational characteristics, such as output rating, if memory 22 does not have the designed operational characteristics stored therein.

Voltage regulator 10 further includes communication interface 24. Communication interface 24 enables the receipt of communications input and the delivery of communications output for voltage regulator 10. For example, communication interface 24 may include an input/output line 38 for communication with other regulators. As discussed in FIG. 2, the regulator may operate as a master regulator or as a follower regulator. As a master regulator, the communication interface outputs via line 38 the signal to control the follower regulator(s). Moreover, as a master regulator, the communication interface inputs via line 38 the acknowledgement by the follower regulator(s) of receipt of the signal. Similarly, as a follower regulator, the communication interface inputs via line 38 the signal from the master regulator and outputs the acknowledgement via line 38. As shown in FIG. 1, line 38 is a single, bi-directional digital or analog line. Alternatively, a bi-directional (parallel) bus structure or unidirectional or bi directional line (serial) digital or analog structure may be implemented. Voltage regulator 10 may further include driver 26. For alternators which have a current driver included, driver 26 may comprise a switch, such as a silicon controlled rectifier (SCR) or field current switch, for turning on or off the current driver resident on the alternator for sending current in field coil 42. Alternatively, driver 26 may comprise a switch and a current driver to send current through the field coil 42. In this manner, alternator 30 may be individually responsive to an associated control signal 32 that, being inter-operative with the output stage of its associated voltage regulator, will drive its field coil 42 to produce electrical power.

The major components within voltage regulator 10 communicate with the processor and each other either via a bus 28 or by direct connection (point to point). Further, a variety of signals may be present in the system such as voltage, current, frequency, amplitude, or pulse width modulated signals. Examples of these signals shown in FIG. 1 include the control signal 32, feedback voltage 34, output 36, and line 38. As shown in FIG. 1, these signals are represented as wired connections. Alternatively, one, some, or all of these signals may be replaced with wireless connections. Further, the signals, including the control signal 32, feedback voltage 34, output 36, and line 38, may be analog or digital.

Figure 2:
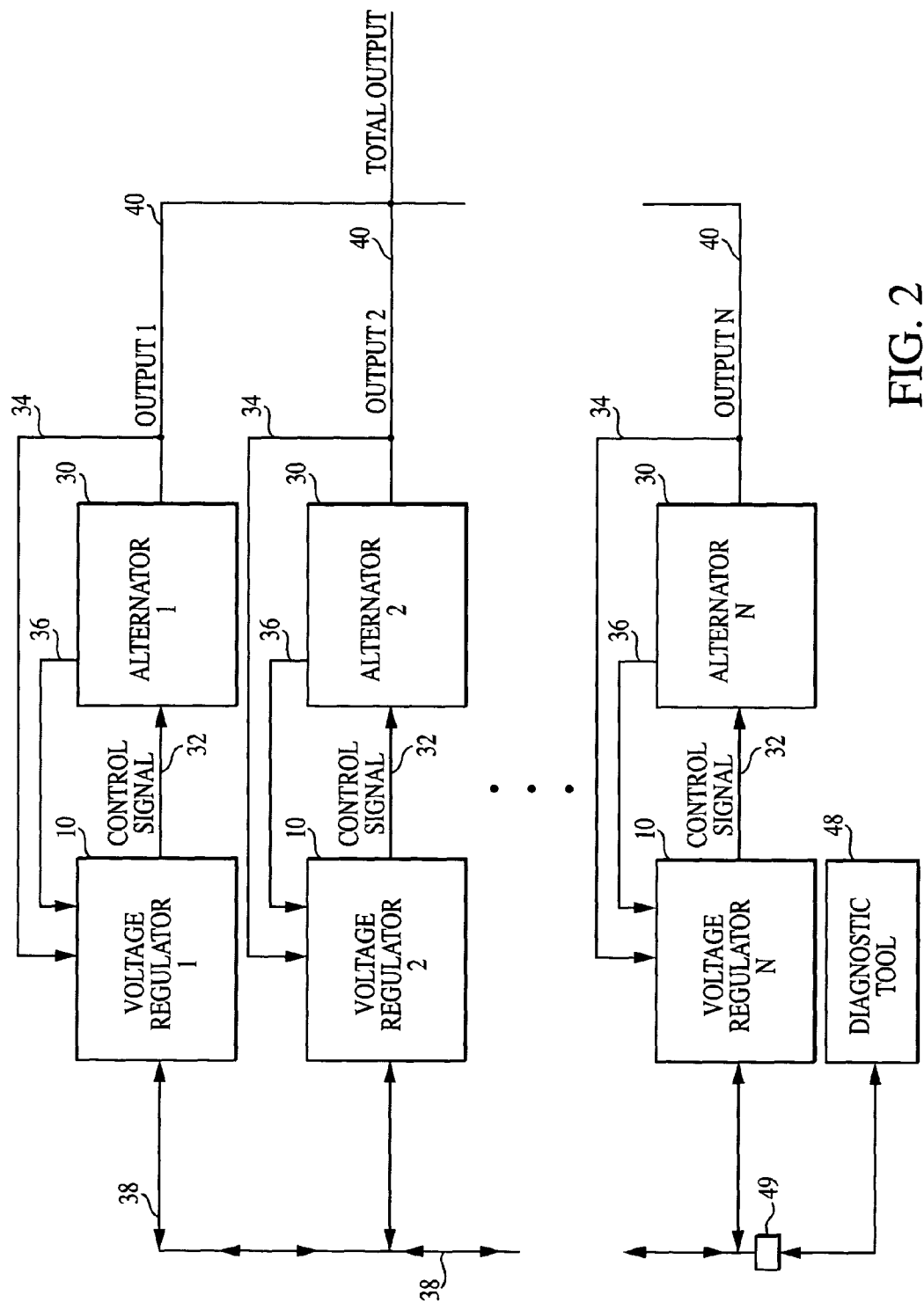
FIG. 2 is an exemplary block diagram of multiple voltage regulator—alternator combinations as shown in FIG. 1 with the alternators electrically connected in parallel.

Referring to FIG. 2, there is shown an exemplary block diagram of multiple voltage regulator—alternator combinations as shown in FIG. 1 with the alternators electrically connected in parallel. Any number of voltage regulator—alternator combinations may be included in the system. For example, as few as two combinations or as many as "N" combinations, as shown in FIG. 2, may be included in the system. While the voltage regulators 10 are shown in FIG. 2 as separate components, multiple voltage regulators may be located within a single housing, or on a single circuit or processor. Further, the alternators in the system may be connected to the same source of motive power (such as a single crankshaft), or may be connected to different sources of motive power (such as separate crankshafts).

Figure 5:
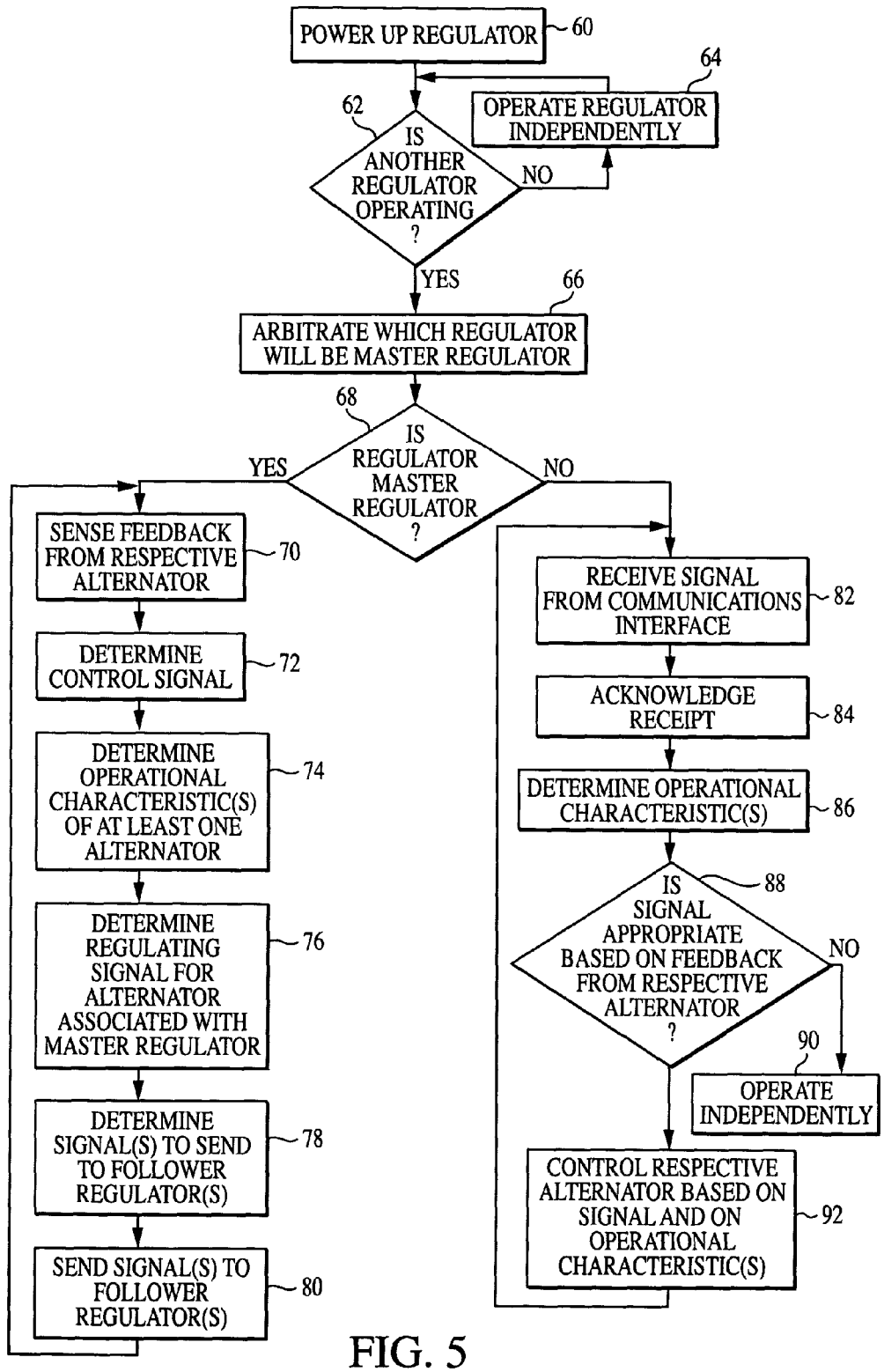
FIG. 5 is an exemplary flow diagram of operation of the multiple voltage regulator—alternator combinations shown in FIG. 2.

As discussed in more detail in FIG. 5, each of the voltage regulators 10 may act as a master regulator or as a follower regulator. Specifically, one of the voltage regulators 10 in the system may be designated as the master regulator and the remainder regulator(s) may be designated as follower regulator(s). The communication to determine which regulator acts as the master and which regulator(s) act as the follower(s) may be conducted via line 38. For example, an arbitration process to determine the master regulator may be performed via line 38.

Once the master and follower regulator(s) are determined, they communicate with one another via line 38. The master regulator may send signals to the follower regulator(s) for control of the alternators associated with the follower regulators. As discussed in more detail below, the sensed feedback sent to the master regulator and operating characteristics of one, some, or all of the alternators may be used to generate signals to control the alternators. The signals to control the alternators may be based on a variety of factors, such as: (1) sharing the load in proportion to the output ratings of the alternators; (2) determining the load based on temperature of one, some or all of the alternators; (3) determining the load based on efficiency of one, some, or all of the alternators; or (4) determining the load based on accumulated operational life of one, some, or all of the alternators. These various determinations are discussed subsequently with respect to FIGS. 5 and 6.

If each of the follower regulators receives the same message, a broadcast message may be sent from the master regulator on line 38 indicating the contribution of each alternator. For example, the master regulator may format the broadcast message as an instruction representing a percentage contribution of the alternator's maximum output. The instruction may be a digital or analog instruction. Further, the instruction may include a number from 0 to 100, with 0 signifying zero percent contribution of the alternator's maximum output and 100 signifying 100% of the alternator's maximum output. Or, the instruction may be a number which may signify a percentage, such as in a system with 0 to 5V, with a 2.5V instruction indicating a 50% contribution.

Alternatively, the follower regulators may receive different messages from the master regulator. In one aspect, the master regulator may send a series of messages, with each message including an address field. The follower regulators may review the address field to determine if the specific message is addressed to the particular follower regulator. In a second aspect, the master regulator may send one broadcast message which includes a look-up table. The look-up table contains a listing of the follower voltage regulator and the corresponding contribution of its respected alternator. After receiving a message from the master voltage regulator, the follower regulator(s) may send a message acknowledging receipt. Further, the message sent by the master regulator may include fault codes that communicate the fault status of the master regulator. Fault codes may include whether an alternator's shaft is not turning or whether an alternator has a fault.

FIG. 2 further shows diagnostic tool 48. Diagnostic tool 48 may communicate with the regulators in the system by connecting to line 38 via port 49. Diagnostic tool 48 may be used during testing of the regulator—alternator system or during operation of the regulator-alternator system. Moreover, diagnostic tool may be a passive device during testing or operation of the regulator-alternator system, such as by merely tapping into line 38 and listening to the communication traffic on line 38. Alternatively, diagnostic tool 48 may be an active device during testing of the regulator-alternator system. For example, diagnostic tool 48 may send commands on line 38 to regulators 10 in the system in order to simulate operation in the field.

FIG. 2 shows a parallel operation of multiple alternators connected to at least one source of motive power. Other parallel operations of two or more sources of electric power, wherein each source of power is independently regulated, may exist in a variety of situations. For example, the electrical output of two or more fuel cells may be operated in parallel to supply power to a common electrical system, and each regulator may control the fuel cell output voltage. Discrete differences in voltage control may occur when two or more devices that generate electric power are independently controlled. Thus, parallel operations of two or more sources of electric power may be controlled by the teachings of the present application.

Figure 3:
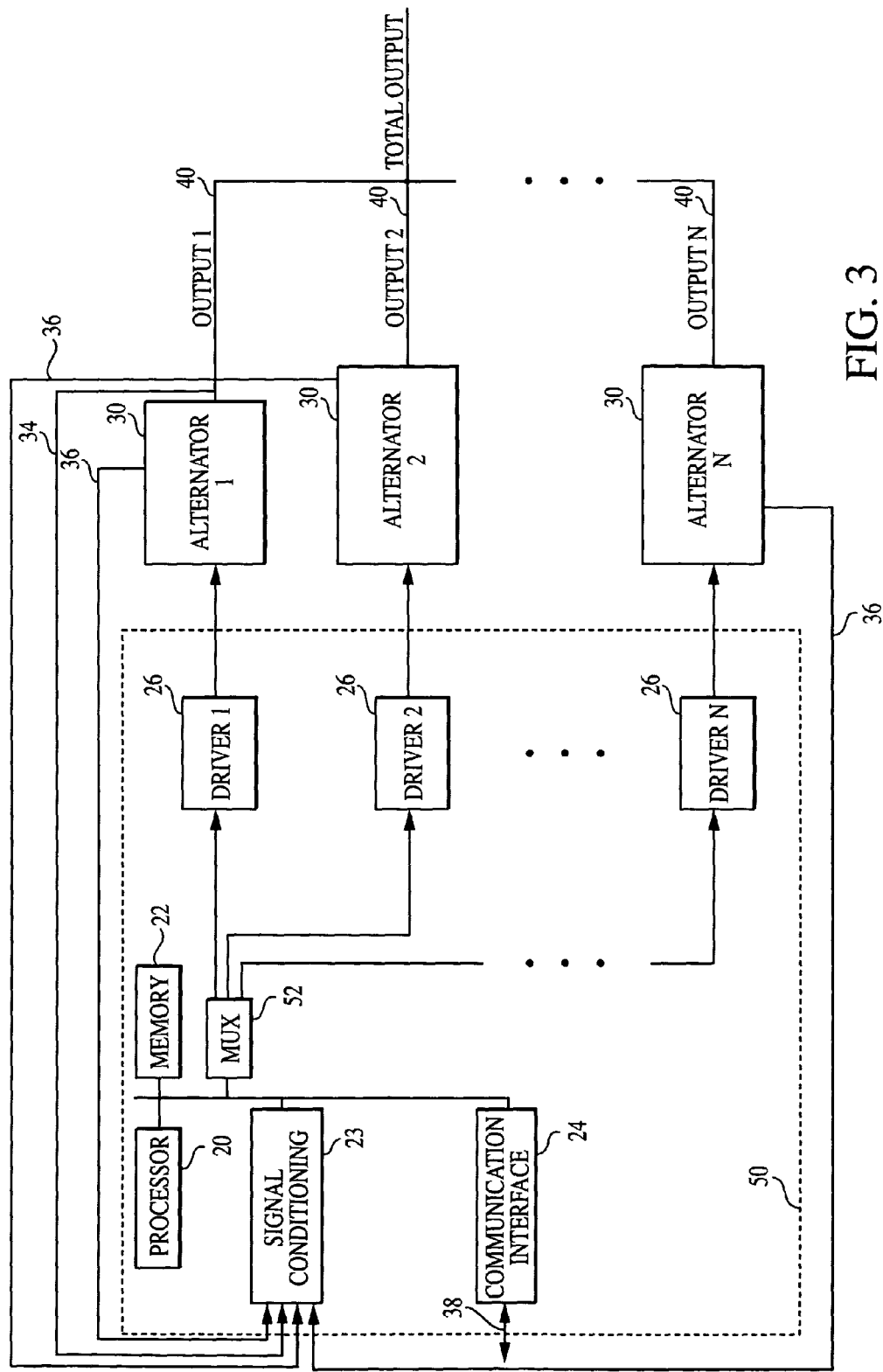
FIG. 3 is an exemplary block diagram of a single voltage regulator controlling multiple alternators, with the alternators electrically connected in parallel.

Referring to FIG. 3, there is shown an exemplary block diagram of a single voltage regulator controlling multiple alternators, with the alternators electrically connected in parallel. Instead of a master—follower voltage regulator configuration, as shown in FIG. 2, a single regulator may be used which controls each of the alternators in the multiple alternator system. Voltage regulator 50 sends a signal to each of the drivers 26, as shown in FIG. 3. Voltage regulator 50 includes similar functionality to voltage regulator 10, as shown in FIGS. 1 and 2. Specifically, voltage regulator 50 includes processor 20, memory 22, signal conditioning interface 23, communication interface 24, and bus 28. Voltage regulator 50 further includes a multiplexer 52 which communicates with multiple drivers 26. As shown in FIG. 3, voltage regulator 50 is outlined by a dotted line to include drivers 26. The voltage regulator 50, including drivers 26, may be located within a single device, such as a single integrated circuit. Alternatively, drivers 26 may be physically located separately from the remainder of voltage regulator 50. For example, the drivers 26 in FIG. 3 may be located proximate to the alternators 30.

As discussed above with respect to FIG. 1, driver 26 may comprise a switch if the current generation is resident in alternator 30. Alternatively, driver 26 may comprise a switch in combination with a current generator. Multiplexer 52 may be connected to each of the drivers 26 via separate electrical connections, as shown in FIG. 3. In this manner, voltage regulator 50 may control each driver 26 individually. Alternatively, multiplexer 52 may be replaced with a single control line between bus 28 and drivers 26. The single control line may be used to each of the drivers 26 in unison. Further, voltage regulator 50 may receive the feedback voltage 34 and outputs 36 (such as ambient temperature, operating temperature, speed, etc.) for each alternator 30 via signal conditioning interface 23.

Figure 4:
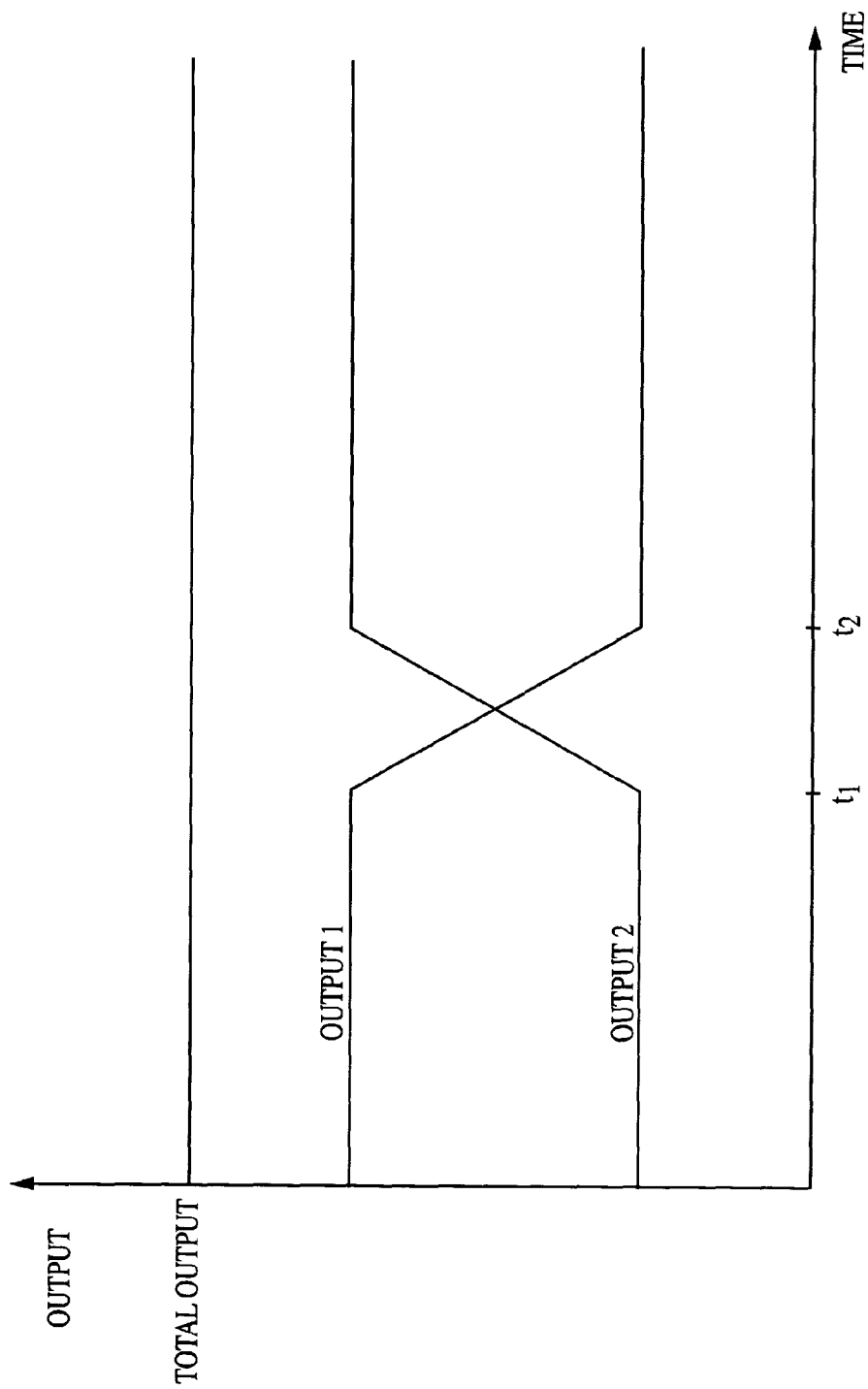
FIG. 4 is a graph of time versus output current for two of the alternators shown in FIG. 2.

Referring to FIG. 4, there is shown a graph of time versus output current for two of the alternators shown in FIG. 2. As shown in the figure, OUTPUT1 for alternator 1 and OUTPUT2 for alternator 2 sum to TOTAL OUTPUT. Because of the common control of the alternators, the outputs of the respective alternators are constant and predetermined, as shown by the constant output of OUTPUT1 AND OUTPUT2. Between time t1 and t2, the master control regulator has switched the ratio for the outputs for each of the alternators. Though, as shown in FIG. 4, TOTAL OUTPUT has remained constant.

Referring to FIG. 5, there is shown an exemplary flow diagram of operation of the multiple voltage regulator— alternator combinations shown in FIG. 2. As shown at block 60, a regulator is powered up. In one aspect of the invention, each regulator may be a master or a follower regulator. In this aspect, the regulators may communicate with one another to determine which regulator is the master regulator. As discussed above, the determination whether a specific regulator is a master or a follower may be determined prior to power up, such as a hardwired switch or a software command configuring the regulator to be a master or a follower. Alternatively, the determination whether a specific regulator is a master or a follower may be determined dynamically after power up. In either configuration, the regulators communicate with one another to inform or decide which regulator is the master regulator.

One method of dynamic determination is through an arbitration process. The regulators may decide, through signaling amongst themselves, which regulator is the master and which regulator(s) is/are the followers. In the instance where an arbitration process determines whether a regulator is a master or a follower, the regulator after power up sends a signal via line 38 to other regulators to determine if there are any other regulators operating, as shown at block 62. If there are no other regulators operating, the regulator operates its associated alternator in an independent mode, as shown at block 64. The regulator periodically may check to determine if another regulator is powered up by looping back to block 62.

If there is another regulator operating in the system, the regulators may arbitrate which will be the master regulator, as shown at block 66. This arbitration may be determined in a variety of ways. One way is to include a random number or a random number generator in each of the regulators. Upon a regulator's sensing another regulator in the system, the random number may be accessed. Alternatively, the random number generator may generate a random number dynamically. The regulator may then wait for a time period based on random number, after which it may broadcast that it is the master regulator if the regulator has not received a similar broadcast prior to that point. For example, a random number may be generated between 0 and 10,000. The random number is multiplied by the time of transmission of a signal between regulators. For example, if the time of transmission is 0.001 seconds, and the random number is 152, the wait time is 0.152 seconds. In this manner, if another regulator has a random number of 153, the difference between wait times is at least 0.001, thus avoiding a possible collision of signals. After the wait time, the regulator may transmit a broadcast message to other regulators in the system declaring that it is the master regulator. This "quick draw" method allows the first regulator to send the broadcast message to declare itself the master regulator.

Another method of arbitration is to select the master regulator based on location, such as the regulator closest to the desired point of voltage regulation. In this scheme, the regulators (not yet arbitrated as master or follower) initially send out the measured voltage value at the alternator or other point to which they are connected. The highest measured value for each individual alternator or regulator suggests the closest proximity to the battery pack or storage device and this regulator therefore "wins" the arbitration process and is designated the master regulator. This scheme has the benefit that the master regulator is arbitrated as the regulator closest to the battery pack and therefore the voltage it measures may be the most appropriate for control of overall desired system voltage. Alternatively, the regulator measuring the lowest voltage may be selected as the master regulator to ensure that even the lowest measured voltage in the system is above a predetermined level.

In still another method of arbitration, a mathematical or statistical process may be used to arbitrate and select a master regulator based on measured voltages such that the regulator with the voltage closest to the mean, median or mode voltage of all those measured may be selected as master. This has the benefit that the system may be automatically configured to regulate the mean, median or mode voltage of the entire system. Any of these voltage based arbitration schemes may further be augmented by the addition of a random number scheme in order to arbitrate between regulators measuring the same voltage in their voltage arbitration scheme alone.

Once arbitration has taken place the master regulator may remain as master for the duration of the present period of operation, i.e., until the electrical or mechanical power to the system is removed or becomes unusable. Alternatively the master regulator may remain as master for a predetermined period of time or until a predetermined set of conditions are met at which point the arbitration process is repeated and a new master regulator may be selected or the master regulator commands a follower regulator to become master regulator. When using voltage as determining the arbitration, the master regulator, and therefore the primary point of voltage reference for the electrical system, may on average move to each available point of voltage regulator in the system. This has the benefit that if the master regulator is arbitrated as being the regulator furthest from the desired point of overall system voltage regulation, this situation does not dominate for an entire period of operation. The exact conditions under which a master regulator may force re-arbitration and become follower can be tailored to suit the requirements of each individual application.

After which, the operation of the regulator depends on whether the regulator is a master or follower, as shown at block 68. The master regulator may typically operate by using a voltage-controlled current source to force a fixed voltage to appear at the output of its associated alternator. Control circuitry in the processor 20 of the master regulator monitors or senses the output voltage, as shown at block 70. As discussed above, the sensed feedback may be taken at any point within the system, such as the output of the alternator associated with the master regulator, an output of another alternator, or the output of the storage device.

Based on the sensed voltage, the control circuitry in the master regulator may determine a control signal for the current source (as required by the load) to hold the alternator output voltage at the desired value, as shown at block 72. The output voltage for the alternator may be controlled using a feedback loop, which may require compensation to assure loop stability. Further, the master regulator may require a finite amount of time to correct the output voltage after a change in load current demand. For example, the current demand for the alternators may change, such as by turning on the air conditioning, requiring the regulator to adjust the current output of the alternators. This time lag defines the characteristic called transient response, which is a measure of how fast the regulator returns to steady-state conditions after a load change.

One example is a control signal which signifies a percentage of the on-time for its associated alternator. Specifically, the control circuitry for the regulator may produce a control signal between 0 and 5000. The values in this range represent the normalized on-time for a regulator. A 3000 value for a control signal indicates that the control circuitry in the master regulator determines that its associated alternator produce to turn the alternator on 60% of the time.

The regulating signal for the alternator associated with the master regulator is generated, as shown at block 76. As discussed in more detail in FIG. 6, the regulating signal may be the control signal generated by the master regulator. Alternatively, the control signal may be modified based on the operational characteristic(s) of one, some, or all of the alternators.

The signal(s) for the follower regulator(s) are also generated, as shown at block 78. As discussed in more detail in FIG. 6, the signal(s) for the follower regulator(s) may be the control signal or may be based on the control signal. For example, the control signal may be normalized and the normalized control signal may be sent to the follower regulators. As another example, the control signal may be modified based on the operating characteristics of one, some, or all of the alternators, and the modified control signal may be sent to the follower regulator(s). If the master regulator modifies the control signal based on the operating characteristic(s) of the alternator associated with the master regulator, the master regulator may receive the operating characteristic(s) via line 36. Moreover, if the master regulator modifies the control signal based on the operating characteristic(s) of the alternator associated with a follower regulator, the master regulator may receive these operating characteristics via the follower regulator through the communication interface 24. After which, the signals are sent to the follower regulators, as shown at block 76.

The master regulator may receive an acknowledgment from the follower regulator(s). The acknowledgment may indicate whether the follower regulator(s) have implemented the signal from the master regulator or whether the follower regulator(s) are operating in independent mode.

As a follower regulator, the follower regulator receives the signal from the master regulator on the communications interface, as shown at block 82. If the follower regulator does not receive the signal from the master regulator, the follower regulator may operate in independent mode, as discussed below. For example, if the follower regulator does not receive the signal within a predetermined time, the follower regulator may assume that the master regulator has malfunctioned or that communications between the master and follower regulator have been severed. If this occurs, the follower regulator operates independently of other regulators in the system.

After receiving the signal from the master regulator, the follower regulator may then acknowledge receipt of the signal, as shown at block 84. Further, the follower regulator may determine the operational characteristic(s) of the alternator associated with the follower regulator, as shown at block 86.

The follower regulator may determine whether the command signal for the follower voltage regulator is appropriate for its respective alternator, as shown at block 88. In one embodiment, the follower regulator does not merely accept the command of the master voltage regulator. Rather, the follower regulator reviews the command to determine if it is acceptable to operate its associated alternator in such a manner. In this way, the follower regulator may independently verify that the command from the master regulator is within acceptable parameters. One manner is for the follower regulator to sense the output for its associated alternator via line 34. Similar to the master regulator, the follower regulator may use control circuitry to generate a control signal. The command of the master regulator may be compared with the control signal generated by the control circuitry of the follower. If the command is outside predetermined guidelines, the command may be rejected. Thus, based on the sensed feedback, the follower regulator may independently verify that the command from the master regulator is acceptable. For example, if the alternators are connected in combination with a 24V battery, the sensed output voltage from the follower alternator is less than 24V, and the command from the master regulator is to reduce the current output of the alternators, the follower regulator may reject this command. Specifically, the follower regulator may determine that, based on the sensed feedback, an increase in the current output of the alternator is required. Another manner of verification is by examining the associated alternator's rated operational guidelines. Typically, an alternator has rated operational guidelines based on its operational characteristics. For example, the alternator may include maximum allowable output based on temperature (ambient and/or alternator temperature), speed, etc. These operational guidelines for the alternator may be in the form of a look-up table and stored in the memory 22 of the follower voltage regulator. Based on the operational characteristics of the alternator, the follower regulator may determine whether the signal sent from the master regulator is within the rated operational guidelines. For example, if the master regulator commands that the follower regulator send a control signal to its associated alternator to operate at 100% output, and based on the current speed and temperature of the alternator, the rated operational guidelines provide that 75% is the maximum allowable output, the follower regulator may reject the command of the master regulator and operate in independent mode.

If the signal sent from the master regulator is not acceptable, the follower regulator may then operate independently, as shown at block 90. In this mode of independent operation, the voltage regulator, previously a follower voltage regulator, operates its associated alternator by sensing the feedback via line 34. The voltage regulator may further receive operational characteristics of its associated alternator via line 36. Based on this input, the control circuitry in the voltage regulator may control the operation of the alternator via its driver 26. The voltage regulator may notify the master regulator of its independent operation, as shown at block 86. As shown in FIG. 5, once a follower regulator operates in independent mode, it may continue to operate independently. Alternatively, the follower regulator may continue to receive commands from the master regulator and accept or reject the commands based on independent verification.

In an alternate embodiment, upon determining that the signal from the master regulator is not appropriate, the follower regulator may send a command signal to the master regulator indicating that the follower regulator will become the master regulator. Alternatively, or in addition, the follower regulator may command the master regulator to control its associated alternator. In this manner, the follower regulator may compensate for a potential failure in the control circuitry of the master regulator.

If the signal from the master voltage regulator is acceptable, the follower voltage regulator controls its respective alternator based on the signal and based on at least one operational characteristic of its associated alternator, as shown at block 92.

Figure 6:
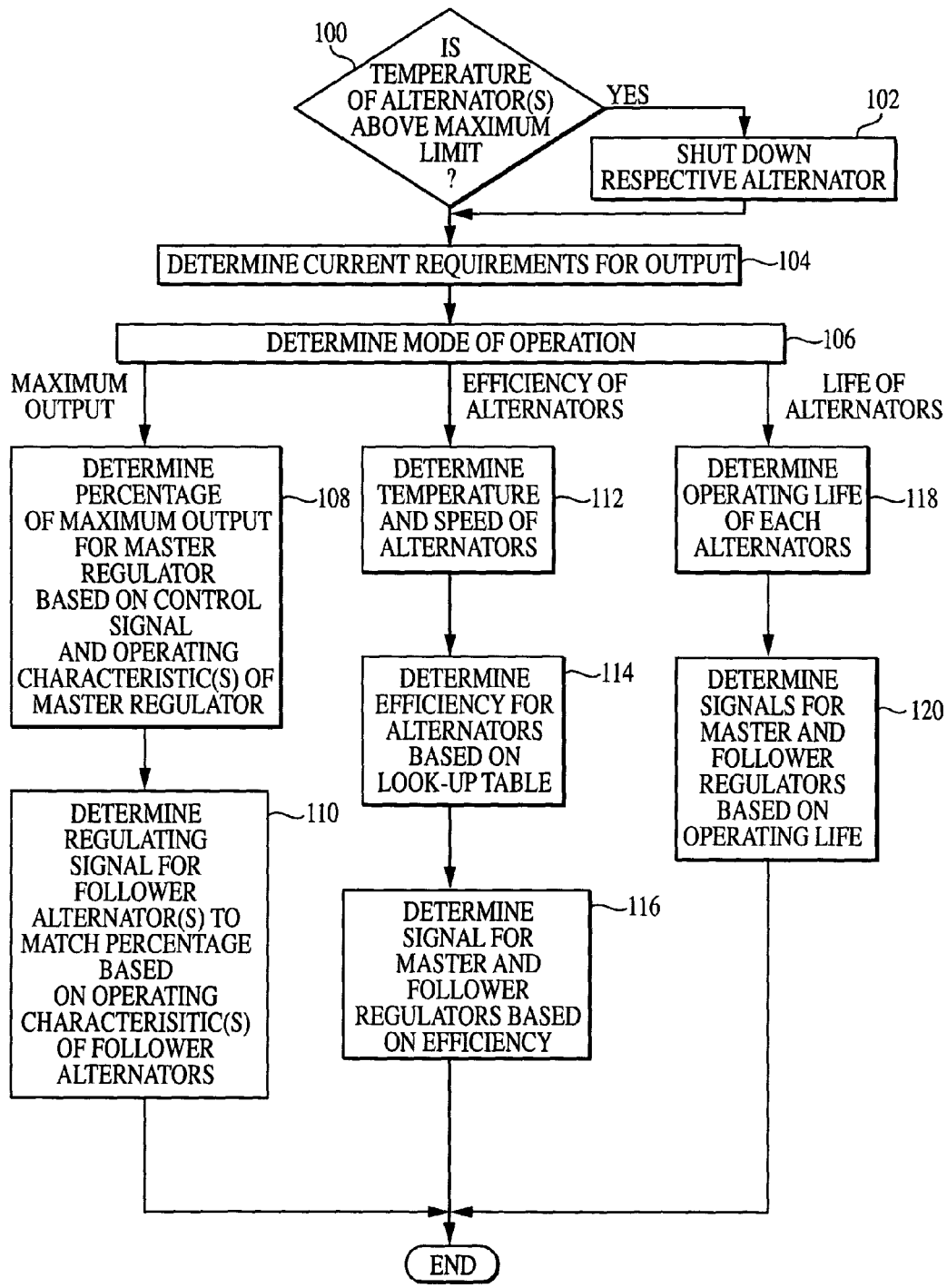
FIG. 6 is an exemplary flow diagram for determining the signals for the master and follow regulators at block 74 of FIG. 5.

Referring to FIG. 6, there is shown an exemplary flow diagram for determining the signals for the master and follow regulators at block 74 of FIG. 5. As a precaution, the temperatures of one, some, or all of the alternators may be checked to determine if the operational temperatures of the alternators is above a maximum limit, as shown at block 100. The master regulator may check the temperatures for its associated alternator and the follower alternators, if the master regulator receives the temperature data. Alternatively, each regulator (master and follower(s)) may check the temperature for its associated alternator. Further, the check of temperatures may be performed at any point when controlling the alternators.

Alternatively, trends of the temperatures of one, some, or all of the alternators may be analyzed. The trend analysis may be based on the most recent temperatures of the alternators, which may be stored in the master voltage regulator memory. Trend analysis may extrapolate to determine if the alternator will operate outside of its rated range or may determine if the rate of increase in temperature is outside of acceptable limits. If one of the alternators temperatures is above its maximum rated limit, the alternator is shut down, as shown at block 102. Alternatively, rather than shutting down the alternator, the alternator may operate at a predetermined percentage of its capacity, such as 50% of its rated output.

As shown at block 104, the master voltage regulator determines the current requirements based on control circuitry in the master voltage regulator. As discussed above, the control circuitry generates a control signal. Depending on the mode of operation, the master voltage regulator may generate a regulating signal for its associated alternator: (1) based on the control signal; (2) based on the control signal and operating characteristic(s) of its associated alternator; or (3) based on the control signal and operating characteristic(s) of the alternators in the system (including its associated alternator). Likewise, depending on the mode of operation, the master voltage regulator may generate signals to send to the follower regulators: (1) based on the control signal; (2) based on the control signal and operating characteristic(s) of its associated alternator; or (3) based on the control signal and operating characteristic(s) of the alternators in the system (including its associated alternator). The follower regulator may generate regulating signals for its associated alternator: (1) based on the signal from the master regulator; or (2) based on the signal from the master regulator and operating characteristic(s) of its associated alternator.

The master regulator may determine the mode of operation, as shown at block 106. There may be several modes of operation, as shown in FIG. 6, including operating based on the maximum rated output of the alternators, operating based on the efficiency of the alternators, or operating based on the operational life of the alternators. Other modes of operation are possible.

Operating based on the maximum output of the alternators enables the dividing of the load amongst the alternators based on maximum output. As discussed in the background section, the operating conditions for the alternators vary based on many factors including temperature, speed, etc. Thus, one alternator may operate differently from another alternator in the same system. Two alternators may receive the regulating signal, but produce different percentages of their respective rated output. For example, the regulating signal may be 3000 (from a range of 0 to 5000). Even though the designed operational characteristics of the alternators may be the same, because the current operating characteristics of the alternators may be different, a first alternator may operate at 55% of its rated maximum with a regulating signal of 3000 while a second alternator may operate at 50% of its rated maximum at the same regulating signal. Instead, when operating in a mode based on the maximum output, the regulating signal for each of the alternators is generated such that the percentage of maximum output of the alternators is the same (e.g., 55% for each alternator). In this manner, the operation of the alternators in the system may equally contribute based on the percentage of maximum output.

There are a variety of methods for generating regulating signals for each of the alternators so that the percentage of maximum output of the alternators is the same or approximately the same. One method is to receive the control signal from the control circuitry of the master regulator and determine, based on the control signal, what the percentage of maximum output is if the control signal is sent as a regulating signal to the master alternator, as shown at block 108. Regulating signals may be generated for each of the follower alternators such that the output for the follower alternators is the same percentage of their maximum output as the master alternator, as shown at block 110. The percentage of maximum output for the master regulator may be determined via a look-up table for the master alternator. The look-up table, which may be stored in memory 22, may contain percentages of maximum outputs for certain regulating signals, speeds, and temperatures. By inputting the control signal, the speed and the temperature of the alternator, the percentage of maximum output may be determined for the master alternator. Alternatively, the table may contain percentages of maximum outputs for certain regulating signals and speeds. Temperature of the master alternator may be taken into consideration in a separate table. The determined percentage of maximum output may be sent as the signal from the master regulator to the follower regulator(s). The follower regulator may then access its own look-up table for its alternator to generate the proper regulating signal in which to operate at the determined percentage of maximum output, for the speed and temperature of the follower alternator. For example, if the control circuitry for the master regulator generates a control signal of 3000, which translates, based on the look-up table, speed and temperature of the master alternator, 55% of the maximum rating. The 55%, or a signal based on the 55%, may be sent to the follower regulator(s). The follower regulator may generate a regulating signal, such as 3200, by accessing its look-up table, speed and temperature of its associated alternator, to produce a 55% output of the maximum rating for the follower alternator.

Operating based on the efficiency of the alternators enables the dividing of the load amongst the more efficient alternators. Operating characteristics of an alternator, such as speed and temperature, determine the efficiency of an alternator. For example, at high speed operation, the efficiency of the alternator operation is reduced. The master regulator may receive the temperature and speed information for its associated alternator and other alternators in the system, as shown at block 112. The master regulator, which may access look-up tables for each of the alternators, may then determine the efficiency of its associated alternator and other alternators in the system, as shown at block 114. Alternatively, both master and follower regulators may calculate the efficiency of its associated alternator. The follower regulators may sense the operating characteristics to calculate efficiency, such as speed and temperature, and access their look-up tables to calculate the efficiency. This calculation for the follower regulators may be sent to the master regulator via line 38.

Based on the efficiencies of the master and the follower alternators, the master regulator may generate a regulating signal for its associated alternator, and may send a signal to the follower regulator(s). The follower regulator may generate a regulating signal for its associated alternator based on the signal from the master regulator. The master regulator may determine which alternator is the most efficient and generate a signal which would control the alternator to produce a majority, most, or all of the power needed.

Operating based on the operating life of the alternators enables the dividing of the load amongst the newer, or more recently serviced, alternators. The calculation of the operational life of the alternators (either the total life of the alternator or the life of the alternator since last serviced) may be performed by the master regulator. For example, the master regulator may maintain a log of the total operation of its associated alternator and other alternators in the system. Alternatively, the calculation of the operation life of an alternator may be calculated by the associated regulator. Follower regulators may send this calculation to the master regulator via line 38.

After the operating life of the alternators is determined, as shown at block 118, the signals for the master and follower regulators are determined based on the operating life, as shown at block 120. For example, the master regulator may generate signals whereby alternators with a greater remaining operating life may bear a greater portion or all of the load.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations, include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention to protect all variations and modification within the valid scope of the present invention. It is intended that the invention be defined by the following claims, including all equivalents.

The invention claimed is:

1. In a system wherein at least two sources of electric power are connected in parallel, each source of electric power having associated with it a regulator, each regulator for producing a regulating signal for its associated source of electric power, one of the regulators operating as a master regulator and at least one of the regulators operating as a follower regulator, a method for controlling the sources of electric power comprising:
    sensing an output with the master regulator of a source of electric power;
    generating a regulating signal for regulating the source of electric power associated with the master regulator based on the sensed output;
    determining a percentage of maximum output for the source of electric power associated with the master regulator;
    sending a instruction representing the percentage of maximum output from the master regulator to the follower regulator;
    sensing at least one operational characteristic for each source of electric power associated with the follower regulator;
    determining a regulating signal with the follower regulator for producing the percentage of the maximum output for the source of electric power associated with the follower regulator based on the instruction from the master regulator and the operational characteristic.

2. A system for producing electrical power comprising:
    at least two sources of electric power connected in parallel, the sources of electric power individually responsive to an associated regulating signal;
    at least two voltage regulators comprising:
    a master voltage regulator for sending a control signal to at least one follower regulator; and
    at least one follower regulator for receiving the control signal, for sensing at least one operational characteristic of its associated source of electric power, and for determining whether to accept or reject the control signal based on the operational characteristic.

3. The system of claim 2, wherein the sources of electric power comprise alternators producing power from at least one source of motive power;
    further comprising an energy storage device; and
    wherein the alternators are connected in parallel across the energy storage device.

4. The system of claim 2, wherein the energy storage device comprises a battery.

5. In a system wherein at least two sources of electric power are connected in parallel, each source of electric power having associated with it a regulator, each regulator for producing a regulating signal for its associated source of electric power, a method for controlling the sources of electric power comprising
    determining which regulator is a master regulator after power-up of the system;
    sensing an output of at least one of the sources of power;
    generating, by the master regulator, a control signal to control its associated source of electric power;
    sending a signal to a follower regulator based on the control signal;
    generating, by the follower regulator, a regulating signal for a source of electric power associated with the follower regulator based on the at least one signal.

6. The method of claim 5, wherein determining which regulator is a master regulator after power-up of the regulators comprises sending a communication from one regulator to another regulator to determine which regulator is a master regulator.

7. The method of claim 6, wherein sending a communication comprises arbitrating between the regulators to determine which regulator is the master regulator.

8. The method of claim 6, wherein sending a communication from one regulator to another regulator to determine which regulator is a master regulator comprises sending by the one regulator to all remaining regulators a message declaring the one regulator as the master regulator.

9. The method of claim 6, wherein determining which regulator is a master regulator comprises determining which regulator first sends a communication declaring itself the master regulator.

10. The method of claim 5, wherein the sources of electric power comprise alternators producing power from at least one source of motive power; and wherein determining which regulator is a master regulator is based on location of the alternator associated with the regulator.

11. The method of claim 5, wherein determining which regulator is a master regulator is based on voltages measured by the regulators.

12. The method of claim 11, wherein a highest voltage measured by a regulator is determined to be the master regulator.

13. The method of claim 11, wherein determining which regulator is a master regulator is further based on a random number generator.

14. The method of claim 5, wherein determining which regulator is a master regulator comprises statistically analyzing voltages measured by the regulators.

15. The method of claim 5, further comprising determining, for a second time, which regulator is the master regulator.

16. The method of claim 15, wherein determining, for a second time, which regulator is the master regulator is performed a predetermined amount of time after the step of determining which regulator is a master regulator after power-up or is performed if a predetermined set of conditions are met.

17. The method of claim 6, further comprising accessing software to determine whether the one regulator is the master regulator.

18. A voltage regulator having functionality as a master regulator and as a follower regulator comprising:

a processor;

a communication interface in communication with the processor;

memory in communication with the processor; and programming code stored in the memory for determining whether the voltage regulator operates as a master regulator or as a follower regulator.

19. The voltage regulator of claim 18, wherein the programming code comprises instructions for sending a communication via the communication interface to a second regulator regarding determining which regulator is the master regulator.

20. The voltage regulator of claim 18, wherein the programming code comprises instructions for arbitrating between the regulator and a second regulator to determine which regulator is the master regulator.

21. The voltage regulator of claim 20, wherein the programming code comprises instructions for a random number generator.

22. The voltage regulator of claim 18, further comprising a switch, and wherein the programming code comprises instructions for accessing the switch to determine whether the voltage regulator operates as a master regulator or as a follower regulator.

23. The voltage regulator of claim 18, wherein the programming code comprises a constant value for determining whether the voltage regulator operates as a master regulator or as a follower regulator.

24. The voltage regulator of claim 18, further comprising:

programming code comprising instructions for functioning as a master regulator; and programming code comprising instructions for functioning as a follower regulator.

25. The voltage regulator of claim 24, wherein the programming code comprising instructions for functioning as a master regulator comprises:

programming code comprising instructions for sensing an output of at least one alternator;

programming code comprising instructions for generating a control signal based on the sensed output;

programming code comprising instructions for generating a regulating signal for an alternator associated with the master regulator based on the control signal;

programming code comprising instructions for generating a message to be sent to a follower regulator based on the control signal; and programming code comprising instructions for sending the message through the communication interface.

26. The voltage regulator of claim 25, wherein the programming code comprising instructions for functioning as a follower regulator comprises:

programming code comprising instructions for receiving the message through the communication interface; and programming code comprising instructions for generating a regulating signal for an alternator associated with the regulator based on the message received.

27. In a system wherein at least source of electric power are connected in parallel, each source of electric power having associated with it a regulator, each regulator for producing a regulating signal for its associated source of electric power, wherein the improvement comprises:

code in the memory of the regulator for functioning as a master regulator;

code in the memory of the regulator for functioning as a follower regulator; and means for determining whether the regulator is the master regulator or follower regulator, wherein a regulator may function as a master regulator or a follower regulator.

28. The improvement as claimed in claim 27, wherein the code for functioning as a master regulator comprises code for generating at least one signal to send to a follower regulator and sending the signal to the follower regulator.

29. The improvement as claimed in claim 28, wherein the sources of electric power comprise alternators producing power from at least one source of motive power; and wherein the code for functioning as a follower regulator comprises code for receiving the signal from the master regulator and generating a regulating signal based on the signal from the master regulator for controlling an alternator associated with the follower regulator.

30. The improvement as claimed in claim 27, wherein the means for determining comprises code for arbitrating among regulators to determine which regulator is the master regulator.

31. In a system wherein at least two sources of electric power are connected in parallel, each source of electric power having associated with it a regulator, each regulator for producing a regulating signal for its associated source of electric power, one of the regulators being a master regulator and at least one of the regulators being a follower regulator, a method for controlling the sources of electric power comprising sensing, by the follower regulator, at least one operational characteristic for its associated source of electric power;

receiving, by the follower regulator, a control signal sent from the master regulator; and determining with the follower regulator, whether to accept or reject the control signal based on the operational characteristic for the follower's associated source of electric power.

32. The method for controlling alternators in claim 31, wherein the sources of electric power comprise alternators producing power from at least one source of motive power.

33. The method for controlling alternators in claim 32, wherein determining whether to accept or reject the control signal comprises:
generating a follower control signal with the follower regulator based on the output sensed by the follower regulator; and
comparing the follower control signal with the message sent from the master regulator.

34. The method for controlling alternators in claim 31, wherein determining whether to accept or reject the control signal comprises ignoring the message from the master regulator; and
further comprises:
generating a regulating signal with the follower regulator for its associated source of electric power based on at least the operational characteristic for the follower's associated source of electric power.

35. The system in claim 31, further comprising:
rejecting, by the follower regulator, the control signal; and
notifying the master regulator that the follower has rejected the control signal.

36. The system in claim 2, wherein the follower regulator independently verifies whether to use the control signal.

37. The system in claim 2, wherein determining whether to use the follower regulator signal comprises the follower regulator determining, based on the operating characteristic, whether the follower regulator signal is outside predetermined guidelines.

38. In a system wherein at least two sources of electric power are connected in parallel, each source of electric power having associated with it a regulator, each regulator for producing a regulating signal for its associated source of electric power, a method for controlling the sources of electric power comprising:
sending a first communication from the first regulator to the second regulator; and
sending a second communication from the second regulator to the first regulator.

39. The method of claim 38, wherein the sources of electric power comprise alternators producing power from at least one source of motive power; and
further comprising sensing with at least one regulator an output of its associated alternator.

40. The method of claim 38, further comprising:
determining at least one operational characteristic of at least one source of power; and
determining a control signal based on the operational characteristic, the control signal for controlling at least one of the sources of power.

41. The method of claim 40, wherein the operational characteristic comprises voltage.

42. The method of claim 40, wherein the operational characteristic comprises efficiency.

43. The method of claim 42, wherein determining at least one operational characteristic comprises determining efficiency of each source of power; and
wherein determining a control signal comprises the control signal based on the efficiency of each source of power.

44. The method of claim 40, wherein the operational characteristic comprises operational life.

45. The method of claim 44, wherein determining at least one operational characteristic comprises determining operational life of each source of power; and
wherein determining a control signal comprises the control signal based on the operational life of each source of power.

46. The method of claim 40, wherein the operational characteristic comprises percentage of maximum output of at least one of the sources of power.

47. The method of claim 46, wherein determining at least one operational characteristic comprises determining the percentage of maximum output of each source of power; and
wherein determining a control signal comprises the control signal based on the percentage of maximum output of each source of power.

48. The method of claim 40, wherein the operational characteristic comprises temperature.

49. The method of claim 38, wherein the first regulator is adapted to function as a master regulator and a follower regulator; and
wherein the second regulator is adapted to function as a master regulator and a follower regulator.

50. A voltage regulator comprising:
means for receiving a control signal;
means for independently verifying whether to control a source of electric power associated with the voltage regulator using the control signal; and
means for rejecting the control signal, based on the means for independently verifying, and for using a different signal to control the source of electric power.

51. The voltage regulator in claim 50, wherein the means for independently verifying comprises means for determining, based on at least one operational characteristic of the source of electric power, whether the control signal is outside predetermined guidelines.

52. The voltage regulator in claim 51, wherein the operational characteristics are selected from the group consisting of voltage, output rating, temperature, efficiency, speed, and accumulated operational life.

53. A system for producing electrical power comprising:
at least two sources of electric power connected in parallel, the sources of electric power individually responsive to an associated regulating signal;
at least two voltage regulators comprising:
a master voltage regulator for producing a regulating signal to the associated source of electric power, and for sending a follower regulator signal indicative of a percentage of maximum power; and
at least one follower regulator for receiving the follower regulator signal, for sensing at least one operational characteristic of a source of electric power associated with the follower regulator, and for generating a regulating signal for its associated source of electric power based on at least one operating characteristic in order for the source of electric power to operate at the percentage of maximum power.

54. The system in claim 53, wherein the follower regulator senses speed and temperature of its associated source of electric power to generate the regulating signal.

55. A voltage regulator having functionality as a master regulator and as a follower regulator comprising:
a processor;
a communication interface in communication with the processor;
memory in communication with the processor; and
programming code stored in the memory for operating as one of a master regulator or follower regulator and for reconfiguring the voltage regulator to operate as another of the master regulator or follower regulator.

56. The voltage regulator of claim 55, wherein the programming code reconfigures the voltage regulator after a predetermined period.

57. The voltage regulator of claim 55, wherein the programming code reconfigures the voltage regulator after a predetermined condition is met.

58. The voltage regulator of claim 57, wherein the condition comprises:
receiving a control signal from another regulator; and
determining that the control signal should not be used to control a source of power associated with the voltage regulator.

59. In a system wherein at least first source of electric power and a second source of electric power are connected in parallel, the first source of power having associated with it a first regulator, the second source of power having associated with it a second regulator, each regulator for producing a regulating signal for its associated source of electric power, a method for controlling the sources of electric power comprising
operating the first regulator as a master regulator;
operating the second regulator as a follower regulator; and
reconfiguring the first regulator and the second regulator so that the first regulator operates as a follower regulator and the second regulator operates as a master regulator.

60. The method of claim 59, wherein reconfiguring the first regulator and the second regulator is performed after a predetermined period of operation.

61. The method of claim 59, wherein operating the second regulator as a follower regulator comprises receiving, by the second regulator, a control signal from first regulator;
further comprising determining, by the second regulator, that the control signal should not be used to control a source of power associated with the second regulator; and
wherein reconfiguring the first regulator and the second regulator is performed if it is determined that the control signal should not be used to control a source of power associated with the second regulator.

62. The method of claim 59, further comprising, after reconfiguring the first regulator and the second regulator, reconfiguring the first regulator and the second regulator again so that the first regulator operates as a master regulator and the second regulator operates as a follower regulator.

63. The method of claim 62, wherein the first and second regulator alternate between operating as a master regulator and a follower regulator.

64. The method of claim 63, wherein the alternating is based on a predetermined duty cycle.

* * * * *